(12) United States Patent
Moriyama

(10) Patent No.: US 7,104,584 B2
(45) Date of Patent: Sep. 12, 2006

(54) SEAT SLIDE DEVICE FOR VEHICLE

(75) Inventor: Genta Moriyama, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/963,577

(22) Filed: Oct. 14, 2004

(65) Prior Publication Data
US 2005/0093328 A1 May 5, 2005

(30) Foreign Application Priority Data
Oct. 30, 2003 (JP) ............................. 2003-371027

(51) Int. Cl.
*B60N 2/06* (2006.01)
*B60N 2/07* (2006.01)

(52) U.S. Cl. ............................. 296/65.15; 296/65.14; 296/65.18

(58) Field of Classification Search ............ 296/65.15, 296/65.16, 65.18, 65.14; 297/344.11; 248/429, 248/422, 428, 430
See application file for complete search history.

(56) References Cited

U.S. PATENT DOCUMENTS

| | | | |
|---|---|---|---|
| 3,184,209 A | | 5/1965 | Solautti |
| 3,313,512 A | * | 4/1967 | Colautti et al. ............. 248/424 |
| 4,811,925 A | * | 3/1989 | Fujita et al. ................ 248/430 |
| 5,046,697 A | * | 9/1991 | Detloff et al. .............. 248/394 |
| 5,207,473 A | * | 5/1993 | Nawa et al. ............. 296/65.15 |
| 5,292,164 A | * | 3/1994 | Rees ........................ 296/65.15 |
| 5,455,354 A | * | 10/1995 | Wong et al. ................. 546/147 |
| 5,586,740 A | | 12/1996 | Borlinghaus et al. |
| 5,735,500 A | * | 4/1998 | Borlinghaus et al. ....... 248/419 |
| 5,797,293 A | * | 8/1998 | Chaban ..................... 74/89.36 |
| 5,938,265 A | | 8/1999 | Oyabu et al. |
| 6,322,036 B1 | * | 11/2001 | Tame et al. ................. 248/429 |
| 6,352,312 B1 | * | 3/2002 | Rees ........................... 297/470 |
| 6,688,667 B1 | * | 2/2004 | Nishimoto et al. ...... 296/65.15 |
| 6,762,579 B1 | * | 7/2004 | Babcock et al. ............ 318/445 |
| 6,848,664 B1 | * | 2/2005 | Ito et al. ..................... 248/429 |
| 2003/0168566 A1 | | 9/2003 | Ito et al. |

* cited by examiner

*Primary Examiner*—D. Glenn Dayoan
*Assistant Examiner*—Greg Blankenship
(74) *Attorney, Agent, or Firm*—Buchanan Ingersoll & Rooney PC

(57) ABSTRACT

A seat slide device for a vehicle being a width of the seat slide device in the horizontal direction is smaller than the width of the seat slide device in the vertical direction includes a guide rail extending in the back/forth direction of a vehicle seat, including a fixed side vertical wall extending in the vertical direction in cross section thereof, and secured on a vehicle floor at the fixed side vertical wall, a slide rail engaged with the guide rail, guided to slide in the longitudinal direction of the guide rail, including a moved side vertical wall extending in the vertical direction in cross section thereof, and adapted to be mounted on the vehicle seat, a drive member provided in a space formed between the guide rail and the slide rail and rotatably supported by either one of the guide rail or the slide rail, and a driven engaging portion formed at the other one of the guide rail or the slide rail to be engaged with the drive member.

16 Claims, 7 Drawing Sheets

SEAT SLIDE DEVICE FOR VEHICLE

CROSS REFERENCE TO RELATED APPLICATIONS

This application is based on and claims priority under 35 U.S.C. § 119 to Japanese Patent Application 2003-371027, filed on Oct. 30, 2003, the entire content of which is incorporated herein by reference.

FIELD OF THE INVENTION

This invention generally relates to a seat slide device for adjusting the position of a vehicle seat in back/forth direction thereof. More particularly, the invention pertains to a seat slide device providing a space under a front vehicle seat for securing an enough foot space for a rear passenger.

BACKGROUND

A known seat slide device disclosed in U.S. Pat. No. 5,586,740B2 includes a guide rail fixed at a vehicle floor side and extending in longitudinal direction of a vehicle seat and a slide rail fixed at a vehicle seat side to be slidably guided by the guide rail. In cross section view, the width of the seat slide device in the horizontal direction is smaller than the width of the seat slide device in the vertical direction, specifically; the form of the seat slide device is a flat form in cross section. Thus, an enough space in horizontal direction of the seat can be secured, for example, for providing an enough foot space for a rear passenger.

According to such known seat slide device, a drive member rotatably supported at the slide rail is provided outside the space formed between the guide rail and the slide rail. Thus, a driven engaging portion formed at a fixed side vertical wall of the guide rail to be engaged with the drive member is exposed toward a space under the seat.

Thus, a need exists for the seat slide device to not only secure a foot space, but also prevent the driven engaging portion from being exposed on the surface of the guide rail.

SUMMARY OF THE INVENTION

According to an aspect of the present invention, A seat slide device being a width of the seat slide device in the horizontal direction is smaller than the width of the seat slide device in the vertical direction includes a guide rail extending in the back/forth direction of a vehicle seat, including a fixed side vertical wall extending in the vertical direction in cross section being perpendicular to the longitudinal direction of the guide rail, and secured on a vehicle floor at the fixed side vertical wall, a slide rail engaged with the guide rail, guided to slide in the longitudinal direction of the guide rail, including a moved side vertical wall extending in the vertical direction in cross section being perpendicular to the longitudinal direction of the slide rail, and adapted to be mounted on the vehicle seat, a drive member provided in a space formed between the guide rail and the slide rail and rotatably supported by either one of the guide rail or the slide rail, and a driven engaging portion formed at the other one of the guide rail or the slide rail to be engaged with the drive member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
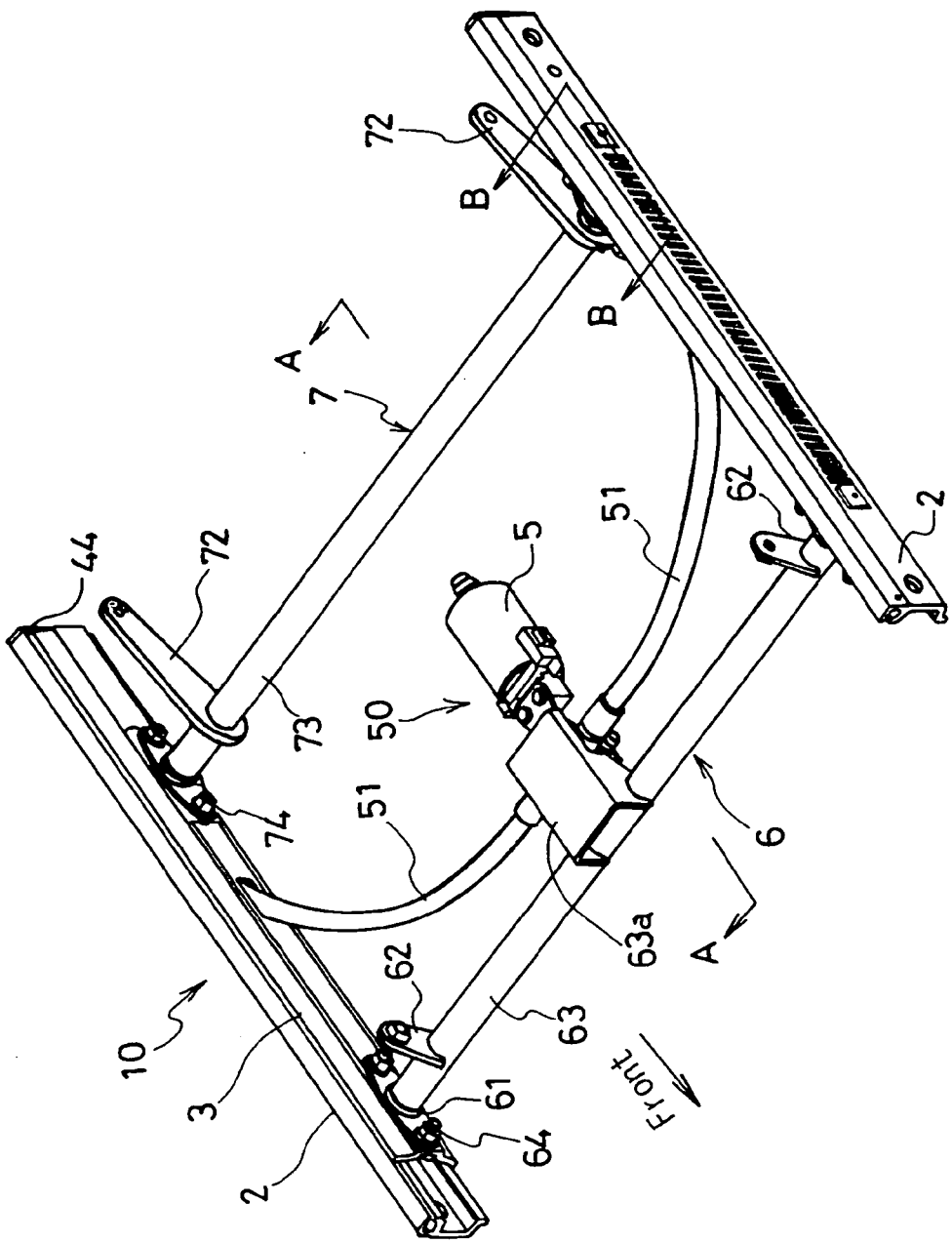
FIG. 1 illustrates a perspective view of the seat slide device according to the present invention.
Figure 2:
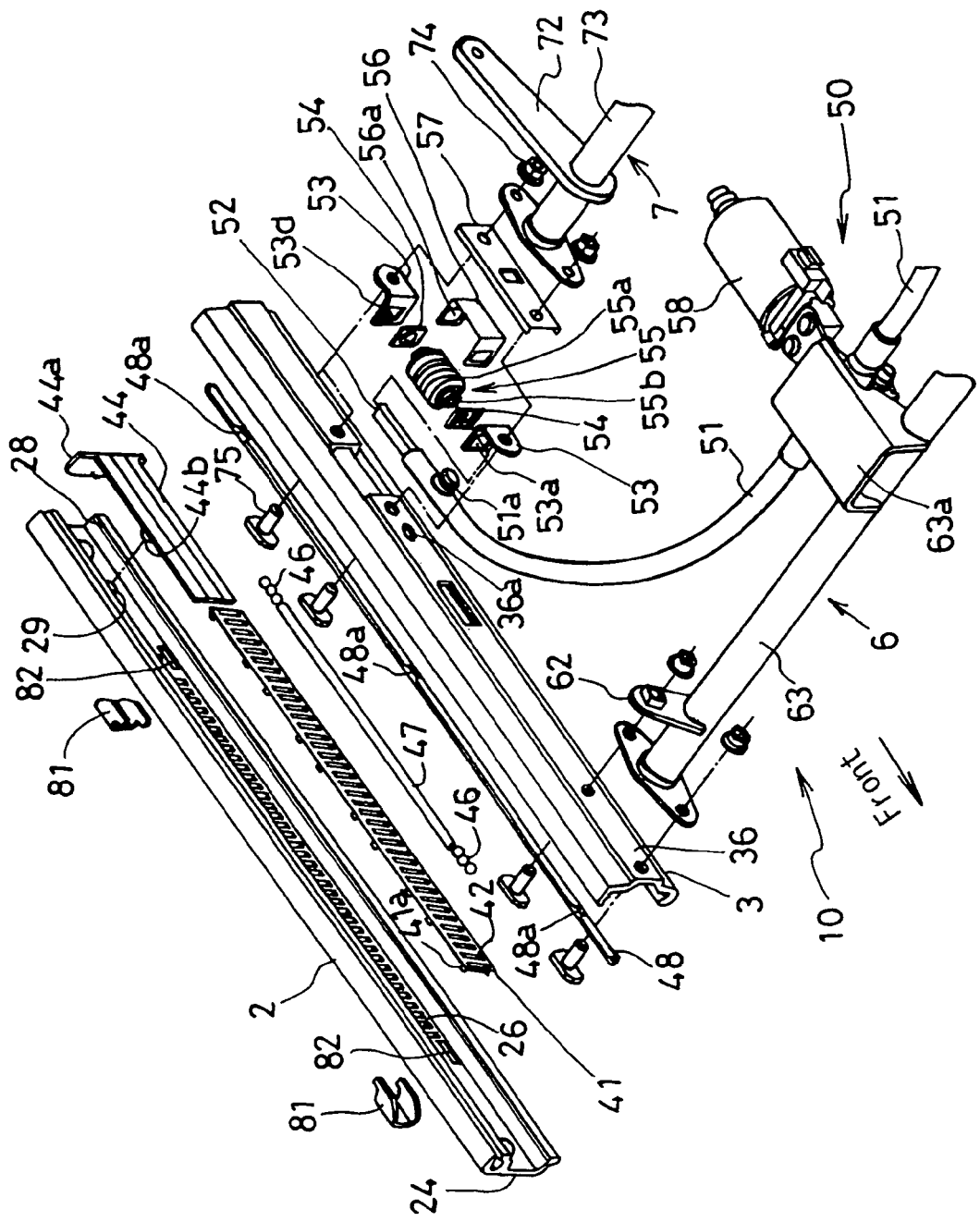
FIG. 2 illustrates an exploded perspective view of the seat slide device according to the present invention.
Figure 3:
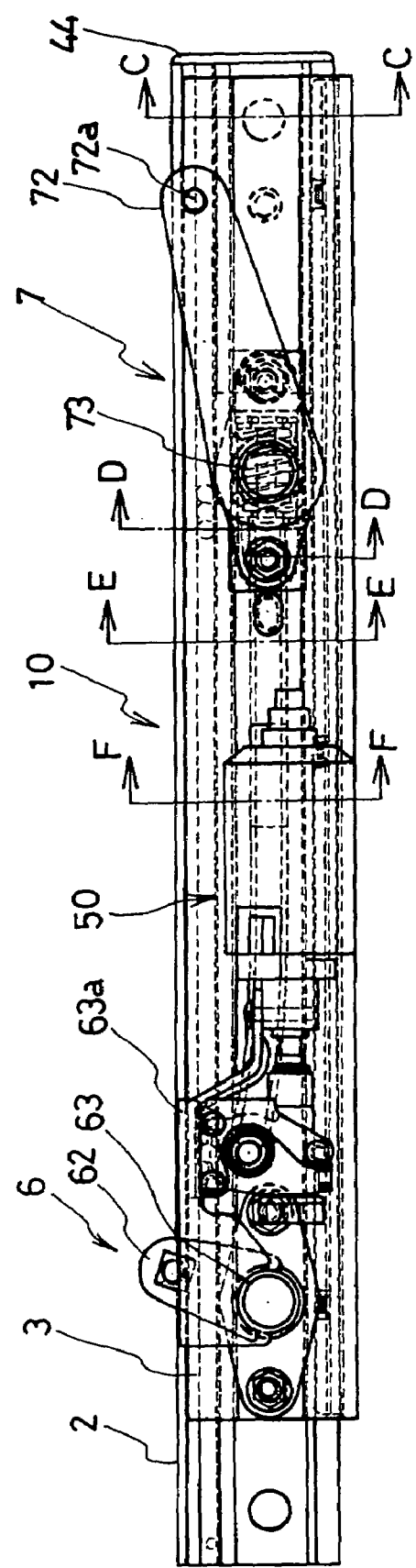
FIG. 3 illustrates a cross sectional view of the seat slide device along the line A—A in FIG. 1.
Figure 9:
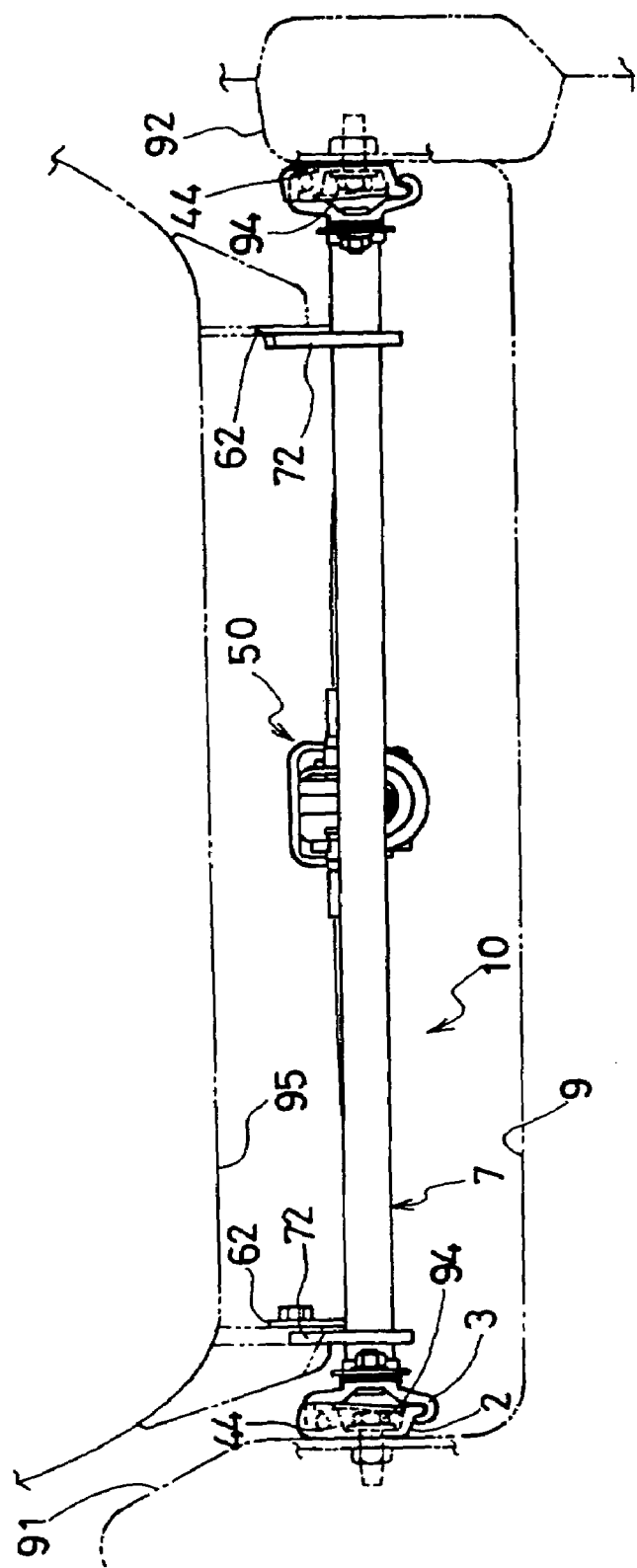
FIG. 9 illustrates a front view of the seat slide device according to the present invention.

An embodiment of the present invention will be explained hereinbelow referring to attached drawings. As shown in FIGS. 1, 2 and 9, a seat slide device 10 according to the present invention includes a guide rail 2 secured on a vehicle floor 9 side and a slide rail 3 engaged with the guide rail 2 to be slidably guided thereby and secured at a seat 95 (shown in FIG. 9) side. The slide rail 3 extends in the longitudinal direction of the seat 95 to be a long shape. A pair of the slide rails 3 are provided at the left and right of the seat 95 in FIG. 9 and firmly connected with a front connecting member 6 having a pipe 63 and a rear connecting member 7 having a pipe 73. The front side of the seat 95 is secured to a front arm 62 fixed at the pipe 63 by means of a screw. On the other hand, the rear side of the seat 95 is secured to a rear arm 72 fixed at the pipe 73 by means of a screw. Each the guide rail 2 and the slide rail 3 has an after-mentioned configuration, so that the seat slide device 10 is a flat shape whose distance between the right and left ends is smaller than its distance between the upper and lower ends.

The seat slide device 10 further includes a drive device 50 for adjusting the position of the seat 95 in longitudinal direction thereof by sliding the slide rail 3 relative to the guide rail 2. The drive device 50 attached at the pipe 63 of the front connecting member 6 with a bracket 63a includes a drive source 58 whose main component is an electric motor and a drive screw 55 connected to the drive source 58 with a drive cable 52. The drive screw 55 is rotatably supported by the slide rail 3 as described later.

Figure 5:
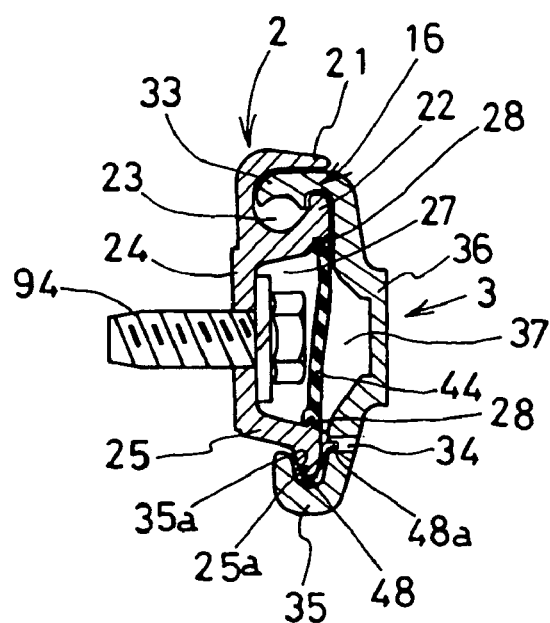
FIG. 5 illustrates a cross sectional view of the seat slide device along the line C—C in FIG. 3.

As shown in FIG. 5 through FIG. 8, an inner vertical wall 36 at which the front connecting member 6 and the rear connecting member 7 are attached is formed at the slide rail 3 in a cross section being perpendicular to the longitudinal direction of the slide rail 3. The both ends of the inner vertical wall 36 extend in vertical direction and bend in horizontal direction to form an upper hem slide flange 33 and a lower hem slide flange 35. The top end of the lower hem slide flange 35 is bent in upper direction to form an U-shaped groove 35a. As shown in FIG. 5, the vertical length from the lower hem slide flange 35 to the upper hem slide flange 33 is longer than the horizontal length from the inner vertical wall 36 to a vertical line connecting the top end of the lower hem slide flange 35 and the top end of the upper hem slide flange 33, so that the slide rail 3 has stiffness against a load applied in vertical direction, which is greater than the stiffness against a load applied in horizontal direction.

On the other hand, the guide rail 2 to be engaged with the slide rail 3 includes an outer vertical wall 24 whose both end portions extend in horizontal direction to form an upper hem guide flange 21 and a lower hem guide flange 25. The guide rail 2 further includes a holder flange 22 as shown in FIG. 5, and a small engaging space 23 is formed between the holder flange 22 and the upper hem guide flange 21. An opening 16 is formed at the right portion of the engaging space 23 in FIG. 5.

As show in FIG. 5, the end portion of the under hem guide flange 25 further extends in lower direction to form a slide convex portion 25a. The vertical length from the lower hem guide flange 25 to the upper hem guide flange 21 is longer than the horizontal length from the outer side vertical portion 24 to a vertical line connecting the top end of the lower hem guide flange 25 and the upper hem guide flange 21, so that the guide rail 2 has stiffness against a load applied in vertical direction which is greater than the stiffness against a load applied in horizontal direction.

Figure 6:
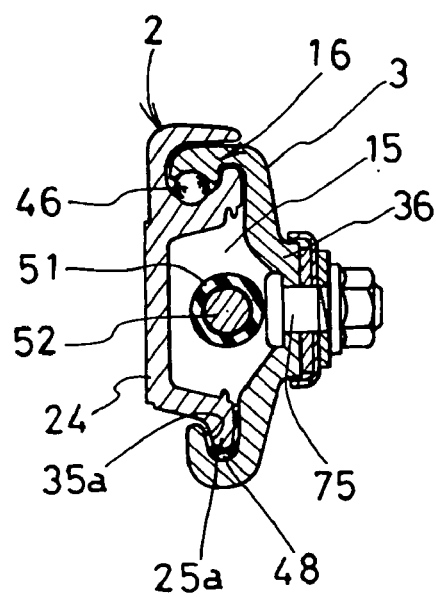
FIG. 6 illustrates a cross sectional view of the seat slide device along the line D—D in FIG. 3.
Figure 7:
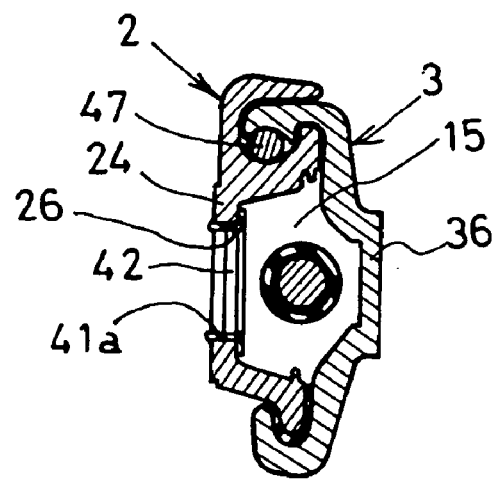
FIG. 7 illustrates a cross sectional view of the seat slide device along the line E—E in FIG. 3.
Figure 8:
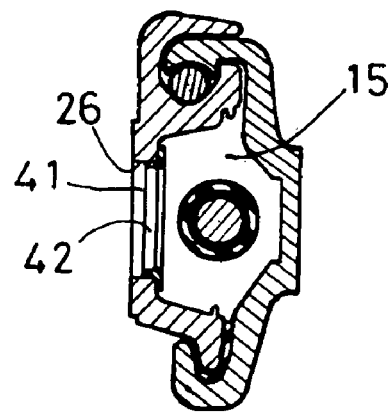
FIG. 8 illustrates a cross sectional view of the seat slide device along the line F—F in FIG. 3.

As shown in FIG. 6, the upper hem slide flange 33 of the slide rail 3 is inserted into the engaging space 23 formed at the guide rail 2 through the opening 16 formed at the right side of the engaging space 23 to be engaged with the guide rail 2. On the other hand, a slide shoe 48 is inserted into the U-shaped groove 35a, further the slide convex portion 25a is inserted into the U-shaped groove 35a to be fit thereinto through the slide shoe 48. In this manner, the guide rail 2 is engaged with the slide rail 3.

In addition, a ball 46 is provided inside the engaging space 23 to facilitate the slide rail 3 sliding on the guide rail 2. The ball 46 is sandwiched in vertical direction by an inner bottom wall of the engaging space 23 and the upper hem slide flange 33 so as to be rolled therebetween. In such configuration, when a load is applied from the seat 95 to the slide rail 3 in the lower direction, the load is transmitted to the upper hem slide flange 33, and then transmitted to the guide rail 2 through the ball 46. Finally, the load is transmitted to the floor 9. It is preferable that the ball 46 is sufficiently greased to secure a smooth slide operation and enough durability when a large load is applied to the seat slide device 10 through the seat 95 by the passenger. Even if the ball 46 is sufficiently greased, the passenger's clothes will not soiled with the grease applied to the ball 46 due to such configuration where the ball 46 is provided within the engaging space 23 only having the small opening 16.

Further, the horizontal movement of the slide rail 3 sliding on the guide rail 2 in FIG. 6 is limited due to that the convex portion 25a is engaged with the U-shaped groove 35a. The seat slide device 10 has a structure where the passenger's load and the load of the seat 95 are not applied to the slide shoe 48, 50 that the convex portion 25a is engaged with and slid on the slide shoe 48 smoothly without applying grease to the slide shoe 48. As shown in FIGS. 2 and 5, the slide shoe 48 is fit into the U-shaped groove 35a, at the same time, nails 48a of the slide shoe 48 is fit into holes 34 formed at the slide rail 3. Thus, if the guide rail 2 and the slide rail 3 are made of light alloy such as aluminum, the slide shoe may be made of a steel plate to obtain enough abrasive endurance. In such configuration, there is no need to apply the grease to the convex portion 25a, so that the passenger's clothes will not be soiled with the grease applied to the ball 46.

As shown in FIG. 2, the balls 46 are divided into two groups, and each group is separated by the separator 47 to be housed into each the engaging space 23.

Further, the slide rail 3 includes a depressed portion 37 at the center portion thereof, and the guide rail 2 also includes a depressed portion 27 at the center portion thereof in cross section so as to form a space 15 therebetween when the slide rail 3 is engaged with the guide rail 2. The drive screw 55 is provided in the space 15 in the manner that rotation axis of the drive screw 55 extends in the longitudinal direction of the guide rail 2 and the slide rail 3.

The drive screw 55 is rotatably supported by a support plate 53 through a bearing 54. Specifically, the support plate 53 is to be attached to the inner vertical wall 36 of the slide rail with the rear connecting member 7 by means of a bolt 75 and a nut 74. The bearing 54 is supported by a hole 53a formed at the support plate 53 to be slightly movable in the horizontal direction (vertical direction in FIG. 4). Further, a hold plate 56 made of elastic material and molded to be approximately an U-shape is fit to the bearing 54 through holes 56a formed at the hold plate 56. A fixing plate 57b including a projecting portion 57a by which the hold plate 56 is pressed is attached to the hold plate 56. In this manner, the driving screw 55 is engaged with and appressed to an engaging hole 26 formed at the guide rail 2.

Figure 4:
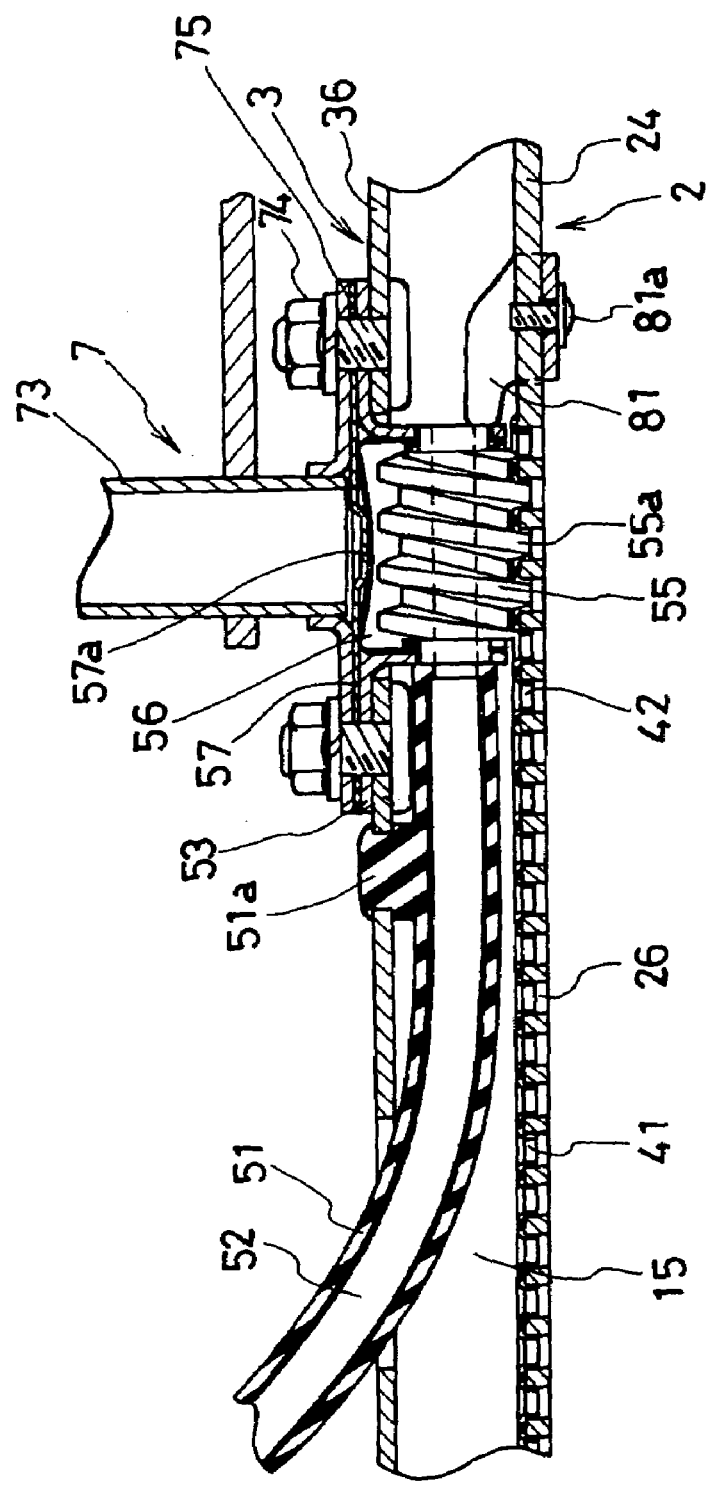
FIG. 4 illustrates a cross sectional view of the seat slide device along the line B—B in FIG. 1.

A brachymorphic hole 55b is formed at the center of the rotation of the drive screw 55. A brachymorphic edge portion of the drive cable 52 is inserted into the brachymorphic hole 55b so as to rotate the drive screw 55 by the actuation from the drive source 58. As shown in FIG. 4, the drive cable 52 is housed in the cable case 51, further, one end of the cable case 51 is supported by the bracket 63a fixed to the front connecting member 6 and supporting the drive source 58. On the other hand, the other end of the cable case 51 is supported at the inner vertical wall 36 in the manner that a boss 51a of the cable case 51 is fit into a hole 36a formed at the inner vertical wall 36.

As shown in FIG. 4. a plurality of the engaging holes 26 being brachymorphic is formed at the outer vertical wall 24 passing therethrough and being equally spaced in longitudinal direction of the guide rail 2. A slide member 41 including collar portions 42 being molded to be engaged with the engaging hole 26 being brachymorphic shape is attached to the guide rail 2. Hooks 41a projecting in the vertical direction are provided at some collar portions 42. The top end of the hook 41a is engaged with the edge of the engaging hole 26 so as to fix the slide member 41 to the guide rail 2. The engaging holes 26 are covered by the siding member 41 at the collar portion 42 thereof, so that the drive screw 55 is engaged with the engaging holes 26 through the collar portion 42. The slide member 41 is made of low-friction material such as resin so as to rotate with engaging relative to the screw portion 55a of the drive screw 55 at low friction. Selecting the low-friction material preferably, the amount of the lubricating grease applied to the slide member 41 can be minimized; further, the lubricating grease can be dispensed.

In such configuration, the engaging holes 26 are formed at the outer vertical wall 24 being a bottom portion of the depressed portion 27 of the guide rail 2, so that it is prevented that the passenger's clothes is soiled by the applied lubricating grease or abrasive powder generated after the long-term use of the seat slide device 10. The slide rail 3 is slid relative to the guide rail 2 in longitudinal direction of the seat by the rotation of the drive screw 55.

As shown in FIG. 2 and FIG. 4, stoppers 81a are fixed with screws 81a to the outer vertical wall 24 of the guide rail 2 next to the both ends of the series of the engaging holes 26. The stoppers 81 are penetrated through holes 82 (shown in FIG. 2) from the outer surface of the outer vertical wall 24. The stoppers 81 are engaged with the side surface of the support plate 53 which supports the drive screw 55 to stop the movement thereof when the slide rail 3 is slid relative to the guide rail 2 to a predetermined front position or a predetermined rear position. Specifically, the movement of he drive screw 55 is limited by the stopper 81 within a range from the predetermined front position to the predetermined rear position. In this way, the slide area of the slide rail 3 in longitudinal direction thereof is limited.

As shown in FIG. 2 and FIG. 5, a cover 44 for the depressed portion 27 is attached at the rear end of the guide rail 2. The cover 44 is provided within an area in which the drive screw 55 and peripheral members thereof are not interfered by the cover 44 when the slide rail 3 is moved to the backmost position of its movable range. The cover 44 includes concave portions at both edge portions thereof in vertical direction in FIG. 5 to be fit to projecting portions 28 formed at the holder flange 22 of the guide rail 2 and the lower hem guide flange 25. Further, a boss 44b (shown in FIG. 2) formed at the side surface of the cover 44 is engaged with a hole 29 of the guide rail 2 so as to be maintained at a predetermined position. The cover 44 further includes a cap portion 44a for covering the rear edge portion of the guide rail 2. The cap portion 44a can hide the rear edge portion and the attaching means from the rear passenger's view.

The seat slide device 10 according to the present invention having the aforementioned configuration is mounted to the vehicle as follows. The guide rail 2 provided at one side of the vehicle seat is fixed at a vertical surface of a locker portion 92 of the floor 9, and the guide rail 2 provided at the other side of the vehicle seat is fixed at a vertical wall of a tunnel portion 91 provided at the center portion of the vehicle in width direction thereof by means of a screw means 94. The slide rails 3 provided at both sides of the vehicle seat are firmly connected with the front connecting member 6 and the rear connecting member 7. In such configuration, the floor 9 is reinforced against an excessive load applied to the vehicle in the vehicle width direction so as to reduce the deformation of the vehicle shape due to such excessive load and secure the passenger's space.

As shown in FIG. 5 through FIG. 8, the guide rail 2 is engaged with the slide rail 3 to form the flat shape whose distance between the right and left ends is smaller than its distance between the upper and lower ends, so that the seat slide device 10 has stiffness against a load applied in vertical direction. In addition, the vehicle is reinforced against an excessive load applied to the vehicle in the vehicle width direction so as to reduce the deformation of the vehicle shape and secure more passenger's space when an excessive load is applied to the vehicle in width direction thereof.

The seat slide device 10 according to the present invention is actuated by the operation of a switch apparatus (not shown) to adjust the position of the seat 95 to be moved in the longitudinal direction of the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seat slide device for a vehicle in which a width of the seat slide device in the horizontal direction is smaller than a height of the seat slide device in the vertical direction comprising:
   a guide rail extending in a back/forth direction of a vehicle seat, including a fixed side vertical wall extending in the vertical direction in cross section and being perpendicular to the longitudinal direction of the guide rail, the guide rail being adapted to be secured to a vehicle floor at the fixed side vertical wall;
   a slide rail engaged with the guide rail and guided to slide in the longitudinal direction of the guide rail, the slide rail including a moved side vertical wall extending in the vertical direction in cross section and being perpendicular to the longitudinal direction of the slide rail, the slide rail being adapted to be mounted on the vehicle seat;
   a drive member provided in a space formed between the guide rail and the slide rail and rotatably supported by either one of the guide rail or the slide rail;
   a driven engaging portion formed at the fixed side vertical wall of the guide rail to be engaged with the drive member; and
   flange portions at upper and lower portions of the fixed side vertical wall, the flange portions extending in the horizontal direction in cross section from the fixed side vertical wall toward the slide rail and being perpendicular to the longitudinal direction of the guide rail.

2. The seat slide device according to claim 1, further comprising:
   a cover provided between the flange portions for covering at least a portion of the driven engaging portion in the longitudinal direction of the guide rail.

3. The seat slide device according to claim 1, wherein the drive member is engaged with the driven engaging portion through a slide member attached to the driven engaging portion.

4. The seat slide device according to claim 1, further comprising:
   a biasing member pressing the drive member to the driven engaging portion.

5. The seat slide device according to claim 1, further comprising
   an engaging space between the guide rail and the slide rail separately from the space, and a rolling member through which the guide rail is engaged with the slide rail is provided in the engaging space.

6. The seat slide device according to claim 1, further comprising:
   a connecting member extending in the horizontal direction and fixed to the moved side vertical wall of the slide rail and for supporting a compressive load applied to the vehicle.

7. The seat slide device according to claim 6, further comprising:
   a drive device supported to the connecting member and coupled to the drive member through a drive cable.

8. The seat slide device according to claim 1, wherein each of the flange portions terminates in a free end portion.

9. A seat slide device for a vehicle in which a width of the seat slide device in the horizontal direction is smaller than a height of the seat slide device in the vertical direction comprising:

a guide rail extending in a back/forth direction of a vehicle seat, including a fixed side vertical wall extending in the vertical direction in cross section and being perpendicular to the longitudinal direction of the guide rail, the guide rail being adapted to be secured to a vehicle floor at the fixed side vertical wall;

a slide rail engaged with the guide rail and guided to slide in the longitudinal direction of the guide rail, the slide rail including a moved side vertical wall extending in the vertical direction in cross section and being perpendicular to the longitudinal direction of the slide rail, the slide rail being adapted to be mounted on the vehicle seat;

a drive member provided in a space formed between the guide rail and the slide rail and rotatably supported by one of the guide rail and the slide rail, a driven engaging portion formed at the other one of the guide rail and the slide rail to be engaged with the drive member; and the drive member being engaged with the driven engaging portion through a slide member attached to the driven engaging portion.

10. The seat slide device according to claim 9, further comprising flange portions at upper and lower portions of the fixed side vertical wall, the flange portions extending in the horizontal direction in cross section and being perpendicular to the longitudinal direction of the guide rail.

11. The seat slide device according to claim 10, further comprising a cover provided between the flange portions for covering at least a portion of the driven engaging portion in the longitudinal direction of the guide rail.

12. The seat slide device according to claim 9, further comprising a biasing member pressing the drive member to the driven engaging portion.

13. The seat slide device according to claim 9, further comprising an engaging space between the guide rail and the slide rail that is separate from the space, and a rolling member through which the guide rail is engaged with the slide rail provided in the engaging space.

14. The seat slide device according to claim 9, further comprising a connecting member extending in the horizontal direction and fixed to the moved side vertical wall of the slide rail to support a compressive load applied to the vehicle.

15. A seat slide device for a vehicle in which a width of the seat slide device in the horizontal direction is smaller than a height of the seat slide device in the vertical direction comprising:

a guide rail extending in a back/forth direction of a vehicle seat, including a fixed side vertical wall extending in the vertical direction in cross section and being perpendicular to the longitudinal direction of the guide rail, the guide rail being adapted to be secured to a vehicle floor so that an exterior surface of the fixed side vertical wall faces a portion of the vehicle floor;

a slide rail engaged with the guide rail and guided to slide in the longitudinal direction of the guide rail, the slide rail including a moved side vertical wall extending in the vertical direction in cross section and being perpendicular to the longitudinal direction of the slide rail, the slide rail being adapted to be mounted on the vehicle seat;

a drive member provided in a space formed between the guide rail and the slide rail and rotatably supported by one of the guide rail and the slide rail;

a driven engaging portion provided at the fixed side vertical wall of the guide rail and engaged by the drive member; and flange portions at upper and lower portions of the fixed side vertical wall, the flange portions extending in the horizontal direction in cross section from the fixed side vertical wall toward the slide rail.

16. The seat slide device according to claim 15, wherein each of the flange portions terminates in a free end portion.

\* \* \* \* \*